Dec. 29, 1931.  G. E. PARKER ET AL  1,838,864
BRAKE APPLYING DEVICE
Original Filed Aug. 8, 1924
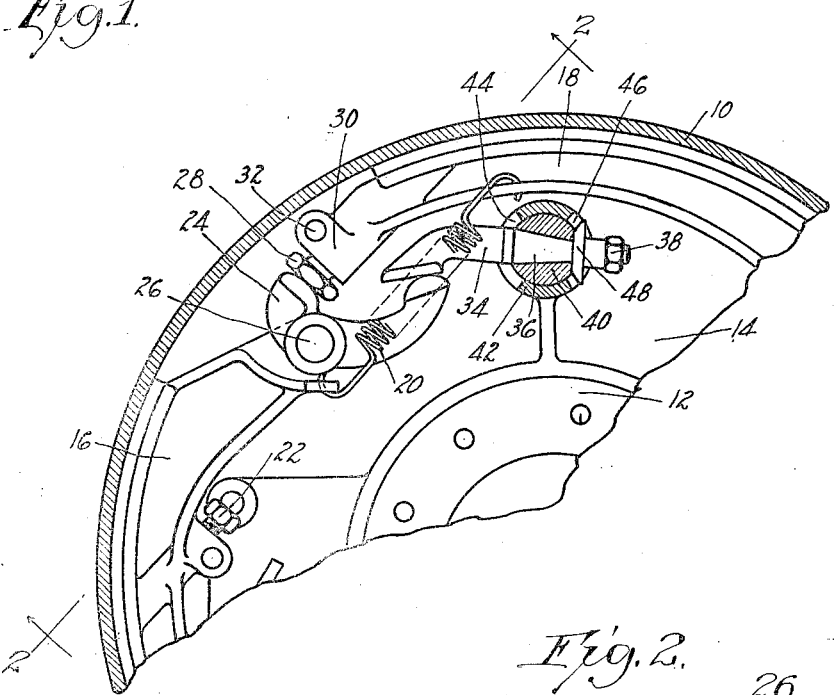
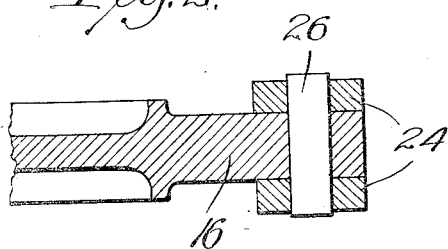
INVENTORS
GUY E. PARKER
ARTHUR H. STAHLHUTH
BY
ATTORNEY Patented Dec. 29, 1931

1,838,864

UNITED STATES PATENT OFFICE

GUY E. PARKER AND ARTHUR H. STAHLHUTH, OF DETROIT, MICHIGAN, ASSIGNORS TO BENDIX BRAKE COMPANY, OF CHICAGO, ILLINOIS, A CORPORATION OF ILLINOIS

BRAKE APPLYING DEVICE

Original application filed August 8, 1924, Serial No. 730,941. Divided and this application filed August 18, 1926. Serial No. 129,957.

This invention relates to devices for applying brakes, and is illustrated as embodied in a novel expanding device acting on the free ends of the shoes of an internal expanding automobile brake. An object of the invention is to provide a simple and efficient device of this character which can shift to balance the forces on the opposite shoes, and which is illustrated as including a lever pivoted on the end of one shoe and having direct wedging engagement with the end of the other shoe.

We prefer to provide, for operating the device, novel means including a rockshaft or the like having a crank arm engaging the end of the above-described lever.

Other features of novelty relate to an adjustment for the part of the shoe engaged by the lever, and to the relative arrangement of the lever and crank arm, and to other novel combinations of parts and desirable particular constructions which will be apparent from the following description of the illustrative embodiment shown in the accompanying drawings, in which:

Figure 1 is a partial vertical section inside the head of the brake drum, through the upper part of the brake, showing the novel brake-applying device in side elevation; and Figure 2 is a partial section on the line 2—2 of Figure 1.

The brake selected for illustration includes a drum 10 rotating with a wheel (not shown), and at the open side of which is a spider or support 12 carrying a backing plate 14. Within the drum is arranged friction means including shoes 16 and 18, which except as further described below may be of any desired form, and which are urged away from the drum by a return spring 20, toward an idle position determined by suitable stops one of which is shown at 22. This particular brake is more fully described and is claimed in our prior application No. 730,941, filed August 8, 1924, of which the present application is a division.

The present application relates to the novel means for applying the brake, by forcing apart the shoes 16 and 18 or their equivalents. In its illustrated embodiment, one of the principal elements of the applying device is a lever 24, having a bifurcated part pivoted at 26 at the end of shoe 16, and having disconnected wedging engagement with a part 28 of shoe 18. Part 28 may be, as shown, a headed thrust member threaded into a recess in a split bore 30 in the end of the body of shoe 18, and held in any desired position of adjustment by contracting the split-bore 30 by means of a clamping screw 32.

Lever 24 is curved to bring its rounded ends in generally horizontal alinement, and is operated by a second lever or crank arm 34 having disconnected wedging engagement with its inner end. Arm 34 has a conical shank 36 clamped by a nut 38 or the like in a cross bore in a shaft 40 journalled in a bearing 42 formed in the spider 12. There are openings 44 and 46 formed on opposite sides of bearing 42 for the ends of arm 34. Arm 34 carries a stop member 48 held by nut 38 and engageable with opposite sides of opening 46 to limit movement of the arm.

It will be observed that lever 24 is free to shift with the shoes to balance the pressures on them, thus automatically adjusting itself in case of uneven wear of the lining, and that part 28 may be adjusted to take up for such wear.

While one illustrative embodiment has been described in detail, it is not our intention to limit the scope of the invention to that particular embodiment, or otherwise than by the terms of the appended claims.

We claim:

1. A brake comprising, in combination, shoes having adjacent free ends, and an expanding device mounted on one of said ends and having a direct wedging but disconnected engagement with the other of said ends.

2. A brake comprising, in combination, shoes having adjacent free ends, and a lever pivoted on one of said ends and having a direct wedging but disconnected engagement with the other of said ends.

3. A brake comprising, in combination, shoes having adjacent free ends, and a lever pivoted on one of said ends and having a direct wedging but disconnected engagement with the other of said ends, together with an operating lever having a direct wedging but disconnected engagement with the pivoted lever.

4. A brake comprising, in combination, shoes having adjacent movable ends, a lever pivoted on one of said ends and having direct disconnected wedging engagement with the other of said ends and having an integral operating arm extending radially inward, and brake-applying means operatively engaging said arm.

5. A brake comprising, in combination, a drum, an expansible friction device inside of the drum having adjacent ends, a lever pivoted on one of said ends, a stop on the other end directly engaged by the outer end of said lever, and a rock member engaging the inner end of the lever to turn it to apply the brake.

6. A brake comprising, in combination, friction means having adjacent ends which are movable in opposite directions, and floating expanding means including a lever intermediately pivoted on one of said ends and having direct disconnected engagement with the other of said ends.

7. A brake comprising, in combination, friction means having adjacent ends which are movable in opposite directions, and floating expanding means including a lever pivoted on a part at one of said ends and having direct disconnected engagement with a part at the other of said ends, one of said parts being adjustable to take up for wear of the friction means.

8. A brake comprising, in combination, friction means having adjacent relatively-movable ends, a lever pivoted on one of said ends, and a part mounted on the other of said ends and adjustable toward and from the first end and directly and disconnectedly engaged by said lever.

9. A brake comprising, in combination, friction means having adjacent relatively-movable ends, a lever pivoted on one of said ends, and a part threaded into the other of said ends and adjustable toward and from the first end and having a head directly and disconnectedly engaged by said lever.

10. A brake comprising, in combination, friction means having adjacent relatively-movable ends, a lever pivoted on one of said ends and having direct disconnected engagement with the other, and a second lever having disconnected engagement with the end of the first lever to operate it.

11. A brake comprising, in combination, friction means having adjacent relatively-movable ends, a lever pivoted between its ends on one of said ends and having direct disconnected engagement at its outer end with the other, and a second lever having disconnected engagement with the inner end of the first lever to operate it.

12. A brake comprising, in combination, friction means, an expanding device therefor carried by the friction means, and operating means for the expanding device including a rockshaft projecting within the friction means and an operating crank arm carried by the rockshaft and extending radially thereof into disconnected thrust engagement with the expanding device.

13. A brake-applying device including a bearing having openings on opposite sides, a shaft in the bearing having a crossbore, an operating arm in the crossbore and extending radially of the shaft through said two openings, and clamping means on one end of said arm engaging the shaft through the corresponding opening, the other end of the arm extending as a brake-applying member radially of the shaft.

14. A brake-applying device including a bearing having openings on opposite sides, a shaft in the bearing having a conical crossbore, an operating arm having a conical portion in the crossbore and extending radially of the shaft through said two openings, and clamping means on one end of said arm engaging the shaft through the corresponding opening, the other end of the arm extending as a brake-applying member radially of the shaft.

15. A brake applying device comprising, in combination, a bearing having an opening in its side, a shaft in the bearing, an arm carried by and extending radially of the shaft through said opening, and a part on the arm engageable with the sides of the opening to limit movement of the shaft.

16. A brake comprising, in combination, friction means having separable ends, a lever arranged between said ends and arranged to pry said ends apart and which is bodily shiftable to balance the pressures on said ends, a rock-shaft adjacent said ends, and another lever carried and operated by said rock-shaft and disconnectedly and directly engaging the bodily-shiftable lever.

17. A brake comprising, in combination, friction means having separable ends, a lever arranged between said ends to pry said ends apart, said lever carried by the friction means and bodily shiftable therewith to balance the pressures on said ends, and another lever mounted on a fixed fulcrum and directly operatively engaging the first lever.

18. A brake comprising a drum and a backing plate at the open side of the drum and friction means within the drum having separable ends, and, in combination therewith, a lever arranged to pry said ends apart to apply the brake and which is mounted on one end of said friction means to shift bodily to balance the pressures on said ends, a shaft extending through the backing plate into the drum, and a lever fixedly secured to the end of the shaft and operatively engaging the bodily-shiftable lever.

19. A brake comprising a drum and a backing plate at the open side of the drum and friction means within the drum having separable ends, a lever carried on the friction means arranged to pry said ends apart to apply the brake with balanced pressures on said ends, and operating means supported by the backing plate including a lever operatively engaging the lever on the friction means.

In testimony whereof, we have hereunto signed our names.

GUY E. PARKER.
ARTHUR H. STAHLHUTH.